United States Patent [19]
Iwata

[11] Patent Number: 4,879,499
[45] Date of Patent: Nov. 7, 1989

[54] INDUSTRIAL ROBOT'S ARTICULATE DEVICE

[75] Inventor: Masanari Iwata, Aichi, Japan

[73] Assignee: Mitsubishi Denki Kabushiki Kaisha, Tokyo, Japan

[21] Appl. No.: 239,371

[22] Filed: Sep. 1, 1988

[30] Foreign Application Priority Data

Sep. 1, 1987 [JP] Japan ................................ 62-216373

[51] Int. Cl.$^4$ ........................................... B25J 19/06
[52] U.S. Cl. ........................... 318/568.16; 318/568.15;
    318/568.21; 318/567; 318/566; 318/626;
    364/513; 901/2; 901/12; 901/41; 414/753
[58] Field of Search ................................ 318/563–577,
    318/620–636, 578, 446, 466; 364/513; 901/2, 9,
    10, 12, 13, 14, 15, 19, 27, 28, 29, 33, 34, 35, 46,
    47; 414/753

[56] References Cited

U.S. PATENT DOCUMENTS

| 4,099,409 | 7/1978 | Edmond | 901/9 X |
|---|---|---|---|
| 4,293,806 | 10/1981 | Kull et al. | 318/466 X |
| 4,316,329 | 2/1982 | Watson | 901/34 X |
| 4,561,816 | 12/1985 | Dingess | 901/41 X |
| 4,573,271 | 3/1986 | Hamilton et al. | 901/9 X |
| 4,586,868 | 5/1986 | Nakashima et al. | 901/12 X |
| 4,599,546 | 7/1986 | Uemura | 318/446 X |
| 4,633,414 | 12/1986 | Yabe et al. | 901/2 X |
| 4,757,458 | 7/1988 | Takemoto et al. | 901/2 X |
| 4,816,728 | 3/1989 | Kurakake | 901/47 X |

FOREIGN PATENT DOCUMENTS

| 3641740 | 6/1988 | Fed. Rep. of Germany | 318/568.11 |
|---|---|---|---|
| 120493 | 7/1983 | Japan . | |
| 211895 | 12/1983 | Japan . | |
| 52292 | 3/1985 | Japan . | |
| 19392 | 7/1985 | Japan . | |
| 0208512 | 9/1986 | Japan | 318/568.16 |
| 611281 | 10/1948 | United Kingdom . | |
| 1214596 | 12/1970 | United Kingdom . | |

Primary Examiner—William M. Shoop, Jr.
Assistant Examiner—Paul Ip
Attorney, Agent, or Firm—Sughrue, Mion, Zinn, Macpeak and Seas

[57] ABSTRACT

An industrial robot's articulate device comprises: a first arm; a second arm rotatably connected to the first arm; an electric motor for rotating the second arm; a transmission shaft rotatably supported by the first arm for transmitting the output of the electric motor to the second arm; and a detecting mechanism for detecting the position of the second arm with respect to the first arm. The detecting mechanism includes a dog secured to the transmission shaft, a swing lever swingably coupled to the first arm to pose in alternative postures according to the direction of rotation of the dog and a detector for detecting the alternative postures of the swing lever. The detector is constituted by a pair of limit switches, which are provided on both sides of the swing lever to detect the alternative postures thereof.

7 Claims, 6 Drawing Sheets

INDUSTRIAL ROBOT'S ARTICULATE DEVICE

BACKGROUND OF THE INVENTION

1. Field of the Invention

This invention relates to an industrial robot's articulate device.

2. Prior Art

FIG. 1 is a vertical sectional view showing one example of a conventional industrial robot's articulate device. In FIG. 1, reference numeral 1 designates a first arm having an electric motor 3 and a harmonic device 4 at the articulated end thereof. The electric motor 3 is to rotate a second arm 2. The harmonic drive 4 is to lower the output speed of the motor 3 to transmit the torque of the latter 3 to a transmission shaft 5, to the end of which the second arm 2 is secured with bolts 20. The transmission shaft 5 is coupled to the output shaft of the harmonic drive 4 with bolts 17, and rotatably supported by the first arm 1 through a bearing 6. Further, in FIG. 1, reference numerals 14 and 15 designate bearing retaining plates which fixedly support the bearing 6 with bolts 18 and 19; 13, a dog for detecting a second-arm overrunning, secured to the outer cylindrical wall of the transmission shaft 5; 23, a limit switch provided on the lower surface of the first arm 1; and 24, a limit switch fixing bolt. FIG. 2 is a cross sectional view of the transmission shaft shown in FIG. 1. In FIG. 2, reference numeral 22 designates a limit switch for clockwise rotation overrunning; and 23, a limit switch for counterclockwise rotation overrunning.

The operation of the articulate device thus constructed will be described.

The rotation of the motor 3 disposed on the first arm 1 is applied to the input shaft of the harmonic drive 4, so that, with the speed of rotation of the motor 3 lowered, the torque of the motor 3 is transmitted through the output shaft of the harmonic drive 4 and the transmission shaft 5 to the second arm 2 to rotate the latter 2. As was described above, the dog 13 is secured to the transmission shaft 5. Therefore, when the second arm 2 is rotated beyond the allowable range of rotatory angles, the dog 13 is caused to strike against the limit switch 22 or 23 for detecting the overrunning operation, secured to the first arm 1, so that the limit switch 22 or 23 outputs an overrunning detection signal. The overrunning detection signal thus obtained is applied to a robot controller (not shown), so that the operation of the second arm (or the operation of the robot itself) is stopped immediately. This method eliminates a variety of difficulties which otherwise may be involved when the second arm is turned beyond the allowable range of rotatory angles. FIG. 3 shows the case where the dog 13 strikes against the limit switch 22 with the second arm 2 rotated clockwise (in the direction of the arrow).

In the case of FIGS. 4 and 5, the limit switch 22 is not used as the limit switch for overrunning detection; that is, for the purpose of increasing the allowable range of rotatory angles to 360° or more, the limit switch is so designated as to count the number of the passage of the dog 13. In this case, the original position of the second arm 2 with respect the position of the limit switch 22 is determined as shown in FIG. 4, and how many times the dog 13 strikes against the limit switch 22 and the direction of rotation of the second arm in the operation are stored in memory. At the end of the operation, the second arm 2 is turned in the opposite direction to the original position. Therefore, in this case, the second arm 2 can be turned more than 360° to the extent where the cables connected between the first arm 1 and the second arm 2 are twisted.

In another example of the articulate device, as shown in FIG. 6, a gear 5a is mounted on the transmission shaft 5, a detecting shaft 26 is rotatably coupled to the first arm 1 through a bearing 27, a gear 25 twice as large in radius as the gear 5a is mounted on one end portion of the detecting shaft 26 in such a manner that the gear 25 is engaged with the gear 5a, and a dog 26a is connected to the other end portion of the detecting shaft 26. Limit switches 22 and 23 are arranged in the same manner as those in FIG. 2.

In this case, the speed of rotation of the detecting shaft 26 is half of the speed of rotation of the transmission shaft 5. Therefore, when the transmission shaft 5 is turned through 360° from a predetermined point, the detecting shaft 26 is turned through 180°. Accordingly, if the limit switches 22 and 23 are set at the points which are different by 180° in angular position (phase), then not only the position of the transmission shaft 5 but also the state (the presence or absence of a phase difference of 360°) of the transmission shaft 5 can be detected by determining which of the limit switches 22 and 23 is operated. Thus, the second arm 2 can be rotated more than 360°.

The conventional industrial robot's articulate device is constructed as described above. Therefore, when the allowable range of rotatory angle of the second arm 2 is set to more than 360° (for instance to 400°), the second arm 2 can take two states different by 360° in phase when posed in a certain posture. The robot system must store the two states in some form so that the rotation of the second arm 2 beyond the allowable range is prevented. However, if interruption of the power supply occurs for some cause, the memory of the two states by the electrical means is erased, and therefore even if the power is supplied again, only the position data is obtained; that is, the two states different by 360° in phase cannot be discriminated. This may result in the following difficulty: The second arm 2 is further turned in the same direction beyond the allowable range of rotatory angles, so that the cables connected between the first and second arms 1 and 2 are broken being twisted.

This difficulty may be eliminated by modifying the articulate device as shown in FIG. 6. However, the method is still disadvantageous in that, since the limit switch together with the speed reducing mechanism and the detecting shaft which are additionally provided must be arranged at the articulated part, the articulate device is rather intricate in construction and large in weight.

SUMMARY OF THE INVENTION

An object of the invention is to eliminate the above-described difficulties with a conventional industrial robot's articulate device.

Another object of the invention is to provide an industrial robot's articulate device small in weight and simple in construction in which the second arm can turn through more than 360°, and it will not turn beyond the allowable range of rotating angles even when interruption of the power supply occurs.

In the industrial robot's articulate device of the invention, the second arm detecting mechanism is constituted by a dog secured to the transmission shaft, a swing lever swingably coupled to the first arm or base, to pose in different postures separately according to the directions of rotation of the dog, and detecting means for identifying the different postures of the swing lever.

In the articulate device of the invention, the swing lever poses in two different postures separately according to the directions of rotation of the dog. Two limit switches are employed to determine which of the two postures the swing lever has assumed.

DETAILED DESCRIPTION OF THE PREFERRED EMBODIMENT

Figure 7:
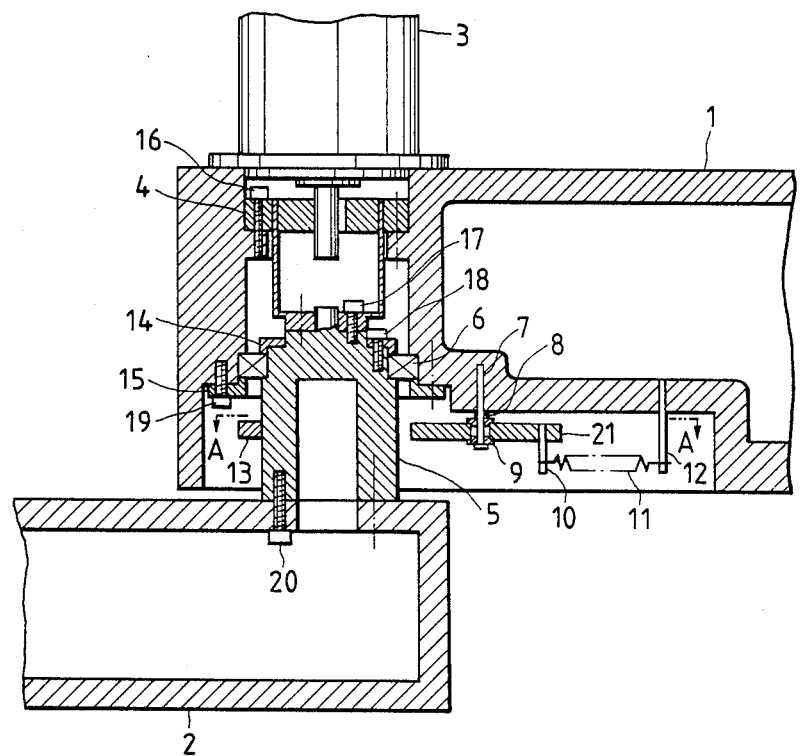
FIG. 7 is a sectional view showing an industrial robot's articulate device according to this invention.
Figure 8:
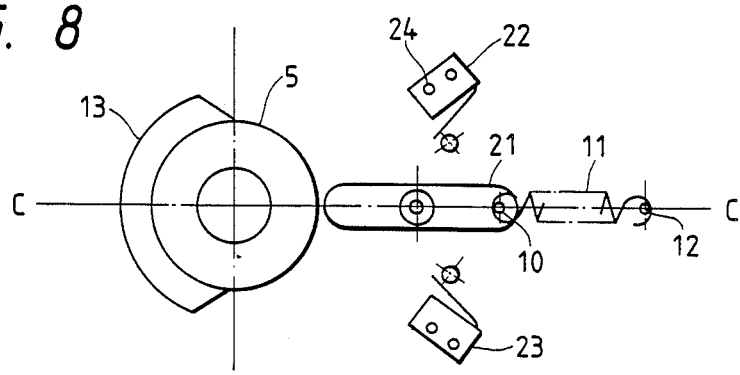

FIG. 7 is a vertical sectional view showing one embodiment of this invention, and FIG. 8 is a sectional view taken along line A—A in FIG. 7. In FIGS. 7 and 8, those components which have been previously described with reference to FIG. 1 are therefore designated by the same reference numerals.

In FIGS. 7 and 8, reference numeral 7 designates a shaft on which a swing lever 21 is rotatably supported with the aid of a collar 8 and a bearing 9; 22 and 23, posture detecting limit switches arranged on both sides of the swing lever 21; and 10 and 12, pins secured to the swing lever 21 and the first arm 1, respectively. A spring 11 is connected between these pins 10 and 12 to restore the lever 21.

The operation of the articulate device thus constructed according to the invention will be described.

Figure 1:
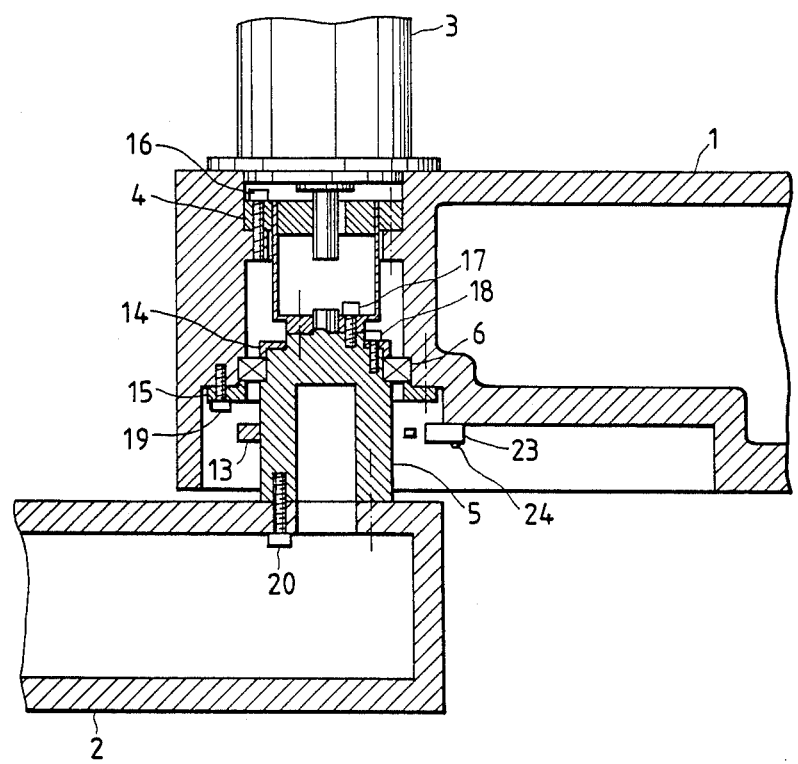
FIG. 1 is a sectional view showing a conventional industrial robot's articulate device.
Figure 6:
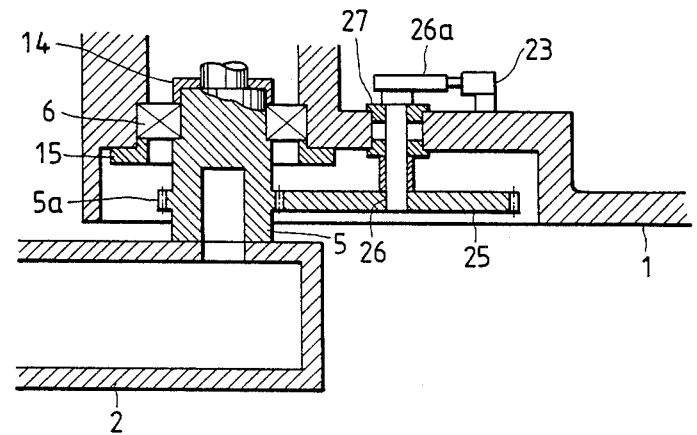
FIG. 6 is a sectional view showing another conventional device.
Figure 2:
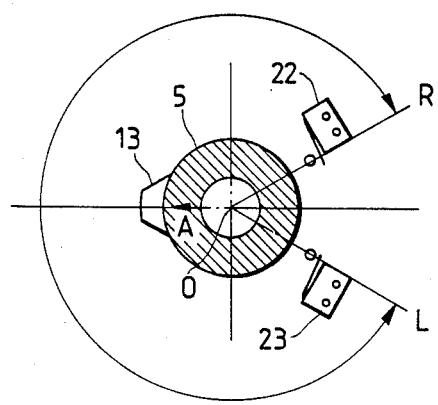
FIGS. 2 through 5 are diagrams used for explaining the operation of the conventional device shown in FIG. 1.
Figure 4:
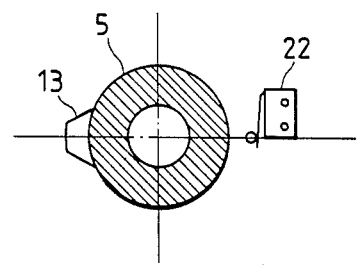
Figure 3:
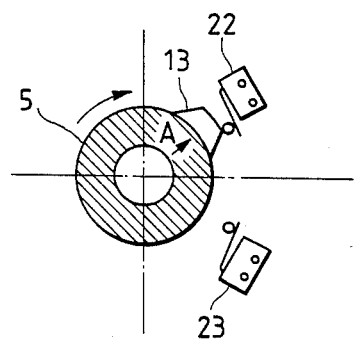
Figure 5:
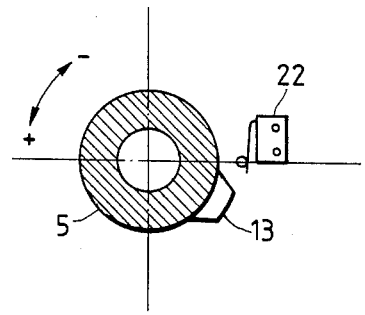
Figure 9:
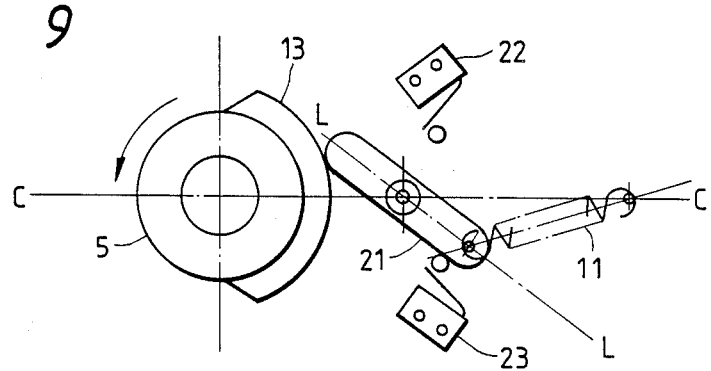

The second arm 2 is driven by the torque of the motor 3 similarly as in the case of FIG. 1. When the transmission shaft 5 is turned counterclockwise through 90°+α (hereinafter referred to as "180°", when applicable) from the reference position (FIG. 8), the dog 13 strikes against the swing lever 21 from below in the figure, as a result of which the swing lever 21 held in the neutral direction CC is swung so as to be laid in the direction LL as shown in FIG. 9. In this operation, the swing lever 21 strikes against the limit switch 23; that is, it is detected that the transmission shaft 5 is turned counterclockwise to the present position.

When, under this condition, the transmission shaft 5 returns to the original position, the swing lever 21 is restored by means of the spring 11, so that it is laid in the direction CC as shown in FIG. 8.

Figure 10:
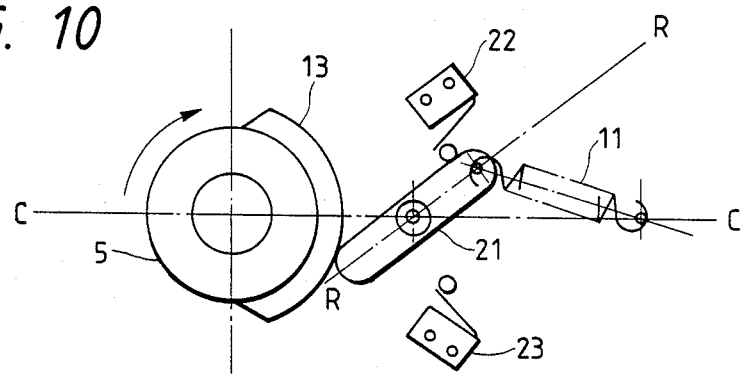

Similarly, when the transmission shaft 5 is turned clockwise from the reference position (FIG. 8), the swing lever 21 is swung striking the dog 13, so that it is laid in the direction RR as shown in FIG. 10. In this operation, the swing lever 21 strikes against the limit switch 22; that is, it is detected that the transmission shaft 5 is turned clockwise to the present position. In this case also, when the transmission shaft 5 returns to the original position, the swing lever 21 is returned to the neutral position in the direction CC.

As is apparent from the above description, the rotations of the transmission shaft in the different directions are detected by the different limit switches, and therefore not only the position data but also the states different in phase difference can be discriminated. Therefore, if, in the case where interruption of the power supply occurs with the transmission shaft 5 turned counterclockwise or clockwise through 180° from the reference position indicated in FIG. 8 as shown in FIG. 9 or 10 (the position of the second arm 2 being the same in both cases), the power supply is applied again, then not only the position of the second arm but also the phase (direction of rotation) of the second arm can be detected by means of the limit switch which is held turned on. Therefore, the transmission shaft 5 can be readily returned to the reference position. Accordingly, the articulate device is free from the difficulty that the second arm 2 is further turned in the same direction beyond the allowable range of rotating angles, thus breaking the cables.

Figure 11:
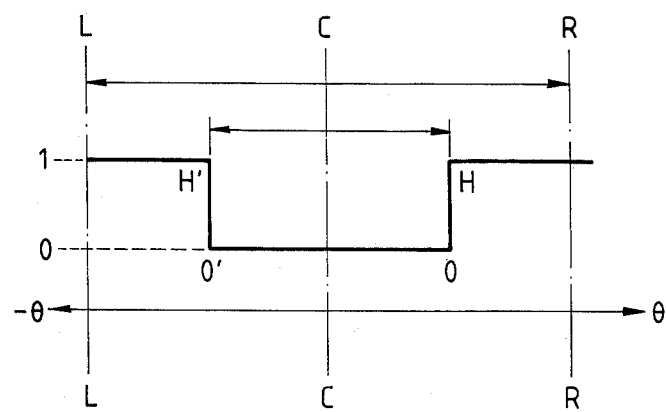
FIGS. 8 through 11 are diagrams used for explaining the operation of the device according to this invention shown in FIG. 7.

FIG. 11 shows the variation in level of the signal provided by the articulate mechanism of the invention. In FIG. 11, $\theta$ represents the angles of rotation of the transmission shaft 5 ($\theta$: the direction of clockwise rotation; and $-\theta$: the direction of counterclockwise rotation); OO', the interval for which the two limit switches 22 and 23 are held turned off (as shown in FIG. 8); OH, the operating point of the limit switch 22; and O'H', the operating point of the limit switch 23.

Figure 12:
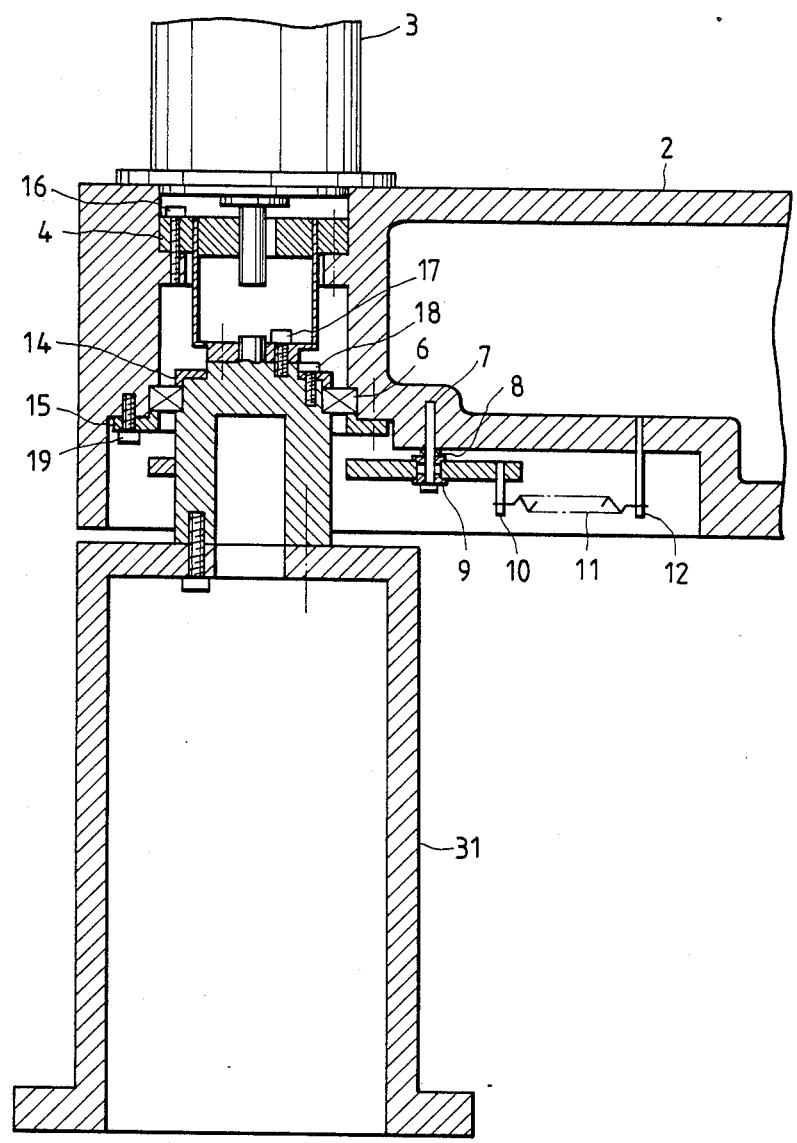
FIG. 12 is a sectional view showing an industrial robot's articulate device according to this invention in which the second arm is coupled directly to the base.

In the above-described embodiment, the second arm is coupled to the first arm; however, the technical concept of the invention is applicable to the industrial robot in which the second arm is coupled directly to a base 31, as shown in FIG. 12. Furthermore, in the above-described embodiment, the speed reducing means is provided at the articulated part; however, it should be noted that the technical concept of the invention is applicable to the DD robot which has no speed reducing means. In the above-described embodiment, the limit switches are employed as the detectors; however, it goes without saying that other detectors such as photo-sensors, proximity sensors and magnetic sensors well known may be employed instead of the limit switches.

Figure 13:
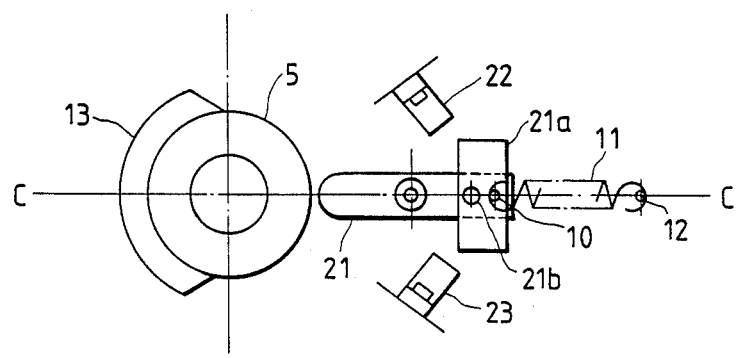
FIGS. 13 and 14 are sectional views showing an industrial robot's articulate device of this invention in which photo-sensors or proximity sensors are employed instead of the limit switches.
Figure 14:
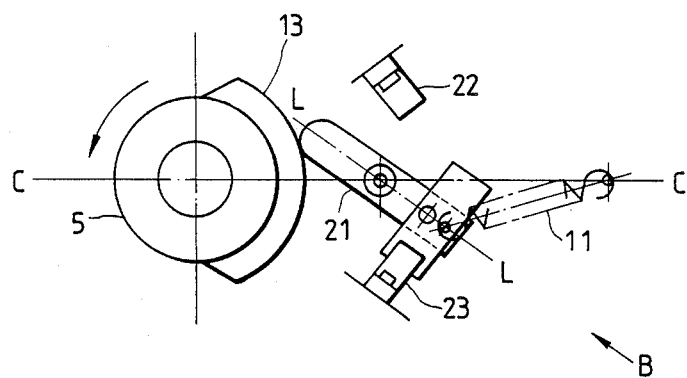
Figure 15:
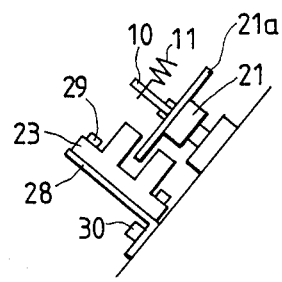
FIG. 15 is a sectional view taken from the allow B in FIG. 14.

FIGS. 13 through 15 show an industrial robot's articulate device in which photo-sensors or proximity sensors 22 and 23 are used. Numeral reference 21a designates a light shield plate; 21b, a bolt; 28, a sensor fitting plate; and 29 and 30, bolts.

As was described above, in the industrial robot's articulate device of the invention, the second arm detecting mechanism is constituted by the dog secured to the transmission shaft, the swing lever swingably coupled to the first arm and posing in different postures separately according to the directions of rotation of the dog, and the detecting means for identifying the different postures of the swing lever. Therefore, the articulate device needs no speed reducing means for detection. Even when interruption of the power supply occurs, the transmission shaft can be returned to the reference position positively. The industrial robot's articulate device according to the invention is small in weight and simple in construction, and has an allowable range of rotating angles of 360° or more.

What is claimed is:

1. An industrial robot's articulate device, comprising:
   first means constituted by one of a first arm and a base;
   second means constituted by a second arm, which is rotatably connected to said first means;
   an electric motor provided on said first means for rotating said second means;
   a transmission shaft rotatably supported by said first means for transmitting the output of said electric motor to said second means; and
   a detecting mechanism for detecting the position of said second means with respect to said first means, said detecting mechanism including a dog secured to said transmission shaft, a swing lever swingably coupled to said first means to pose in alternative postures according to the directions of rotation of said dog, and detecting means for detecting the alternative postures of said swing lever.

2. A device as claimed in claim 1, in which said detecting mechanism further comprises a spring which is connected between said swing lever and said first means for restore said swing lever when said transmission shaft has returned to an original position.

3. A device as claimed in claim 1, in which said detecting means is constituted by a pair of limit switches which are arranged on both sides of said swing lever.

4. A device as claimed in claim 3, in which when said transmission shaft is turned more than 90° from a reference position, said dog strikes against said swing lever so that said swing lever causes one of said pair of switch to turn on.

5. A device as claimed in claim 1, further comprising a speed reducing means for lowering the output speed of said electric motor to transmit the output thereof to said transmission shaft.

6. A device as claimed in claim 1, in which said detecting means is constituted by photo-sensors.

7. A device as claimed in claim 1, in which said detecting means is constituted by magnetic sensors.

* * * * *